United States Patent [19]

Aoki

[11] Patent Number: 5,701,928
[45] Date of Patent: Dec. 30, 1997

[54] LEAK COMPRESSED FUEL GAS DISCHARGING DEVICE

[75] Inventor: Takeshi Aoki, Wako, Japan

[73] Assignee: Honda Giken Kogyo Kabushiki Kaisha, Tokyo, Japan

[21] Appl. No.: 531,590

[22] Filed: Sep. 22, 1995

[30] Foreign Application Priority Data

Sep. 30, 1994 [JP] Japan .................................. 6-259579

[51] Int. Cl.⁶ .............................. B65D 25/00; F16K 24/00
[52] U.S. Cl. .............................. 137/312; 73/46; 123/516; 123/529; 137/351; 137/587; 141/86; 141/98; 220/86.2; 220/746; 222/108
[58] Field of Search ........................... 123/516, 527, 123/529; 73/40.5 R, 46; 137/351, 587, 589, 377, 381, 312; 141/86, 98; 222/108; 220/86.2, 746; 280/834; 285/133.1, 138, 13

[56] References Cited

U.S. PATENT DOCUMENTS

| 2,138,104 | 11/1938 | Kellogg | 220/86.2 |
|---|---|---|---|
| 2,508,124 | 5/1950 | Stephenson | 220/86.2 |
| 2,524,313 | 10/1950 | Gerling | 220/86.2 |
| 3,187,936 | 6/1965 | Downing | 220/86.2 |
| 3,220,393 | 11/1965 | Schlink | 123/527 |
| 3,565,201 | 2/1971 | Petsinger | 123/527 |
| 3,800,978 | 4/1974 | Sigwald | 220/834 |
| 3,802,596 | 4/1974 | Schmidt | 220/86.2 |
| 3,838,713 | 10/1974 | Tubbs | 220/86.2 |
| 4,025,080 | 5/1977 | Gedeon | 280/834 |
| 4,335,697 | 6/1982 | McLean | 123/527 |
| 5,330,031 | 7/1994 | Hill | 280/834 |
| 5,343,902 | 9/1994 | Ramioulle | 220/86.2 |
| 5,518,272 | 5/1996 | Fukagawa et al. | 280/834 |

FOREIGN PATENT DOCUMENTS

2-125421  10/1990  Japan .

*Primary Examiner*—George L. Walton
*Attorney, Agent, or Firm*—Armstrong, Westerman, Hattori, McLeland & Naughton

[57] ABSTRACT

A leak compressed fuel gas discharging device in an automobile having a compressed fuel gas tank arranged within a shut-up compartment such as a trunk room is provided. The device comprises a pipe connecting portion to the compressed fuel gas tank closed up tightly by a covering; a leak compressed fuel gas discharging pipe having a base end connected to the covering air- and watertightly and communicating with a space closed by the covering; a pipe joint integrally fitted with another end of the leak compressed fuel gas discharging pipe, detachably inserted into an opening on a car-body wall from inside toward outside of the compartment and having a swelled portion formed on a outer peripheral surface at the inside of the compartment and an engaging groove formed on a outer peripheral surface at the outside of the compartment directing in a peripheral direction; and a cover member covering the pipe joint at the outside of the compartment which has an opening extending along the pipe joint at one side and an engaging portion provided on an inner surface near the opening and adapted to detachably engage with the engaging groove.

4 Claims, 7 Drawing Sheets

LEAK COMPRESSED FUEL GAS DISCHARGING DEVICE

BACKGROUND OF THE INVENTION

This invention relates to a leak compressed fuel gas discharging device for an automobile in which a compressed fuel gas tank charged with a compressed fuel gas such as methane gas, liquified petroleum gas, hydrogen gas and the like is arranged within a compartment such as a trunk room, and a pipe connecting portion to the compressed fuel gas tank and is closed up tightly by a covering. Particularly, the invention relates to a attaching construction capable of attaching a tip end of a leak compressed fuel gas discharging pipe for discharging fuel gas leaked out from the pipe connecting portion to outside of the compartment or for promoting the leak fuel gas discharging by supplying air from outside, to an opening of the car-body easily and surely.

Hitherto, an automobile having a LPG(liquified petroleum gas) tank arranged within a trunk room has been known. In the automobile, connecting portions among the LPG tank, a pipe for charging LPG into the tank and a pipe for supplying LPG from the tank to an internal combustion engine are closed tightly with an airtight container, an opening provided on a bottom of the airtight container and an opening provided on an airtight bottom was of the trunk room are communicated with each other by a bellows air- and watertighty, the pipes pass through the bellows, and portions of the pipes exposed outside of the trunk room are connected to a junction for charging the fuel and the internal combustion engine (see Japanese Laid-Open Utility Model Publication HEI 2-125421).

In the automobile described in the Japanese Publication HEI 2-25421, when the fuel gas charged in the tank is LPG which is heavier than air, leak LPG can be discharged to the outside of the car through the bellows and the opening of the bottom wall closing the trunk room, however, when the fuel gas is a gas lighter than air, such as methane and hydrogen, leak fuel gas remains within bellows without being discharged through the opening of the bottom wall.

Even if the charged fuel gas is a gas heavier than air, for example LPG, the leak fuel gas can be discharged by being mixed with air, However, since it is difficult for air to flow into the bellows from the outside of car and a mixed gas of leak fuel and air in the bellows is not sufficiently replaced by the air coming from the outside, discharging of the leak fuel can not be carried out smoothly.

SUMMARY OF THE INVENTION

An object of the present invention is to improve the customary leak compressed fuel gas discharging construction in an automobile so as to overcome the difficulties as described above.

According to the present invention, there is provided a leak compressed fuel gas discharging device in an automobile having a compressed fuel gas tank arranged within a shut-up compartment, comprising a pipe connecting portion to the compressed fuel gas tank closed up tightly by a covering; a leak compressed fuel gas discharging pipe having a base end connected to the covering air- and watertightly and communicating with a space closed by the covering; a pipe joint integrally fitted with another end of the leak compressed fuel gas discharging pipe, detachably inserted into an opening on a car-body wall from inside toward outside of the compartment and having a swelled portion formed on a outer peripheral surface at inside of the compartment and an engaging groove formed on a outer peripheral surface at outside of the compartment directing in a peripheral direction; and a cover member covering the pipe joint at outside of the compartment which has an opening extending along the pipe joint at one side and an engaging portion provided on an inner surface near the opening adapted to detachably engage with the engaging groove is provided.

In the leak compressed fuel gas discharging device, the tip end of the leak compressed fuel gas discharging pipe can be attached to an edge port,on of the opening on the car-body firmly and stably in such a manner that the pipe joint fitted with the tip end of the leak compressed fuel gas discharging pipe integrally is inserted into the car-body opening from inside toward outside of the comportment, and the engaging portion on inner surface near the opening of the cover member is engaged with the engaging groove of the pipe joint which is exposed to the outside of the compartment from the car-body opening to pinch the car-body opening edge between the end portion of the cover member and the swelled portion of the pipe joint.

The above-mentioned car-body opening, from which the tip end of the leak compressed fuel gas discharging pipe is exposed to the outside of the oar-body is positioned at a position higher than the space closed by the covering on the pipe connecting portion so that the leak compressed fuel gas leaked from the pipe connecting portion, which is lighter than air, can be discharged. In the case that the leak compressed fuel gas is heavier than air, outside air is introduced into the space closed by the covering through the leak compressed fuel gas discharging pipe to promote discharging of the leak compressed fuel gas through a bottom opening of the closed space.

The tip end of the leak compressed fuel gas discharging pipe can be connected to an opening on a car-body concave wall surrounding a fuel charging mouth provided at a position higher than the space closing the pipe connecting portion by means of the pipe joint. The car-body concave wall is covered with a lid cover, for example, so that the pipe joint is not exposed to the outside to enable maintaining a good appearance of the car-body.

A firing prevention member may be provided on the tip end of the leak compressed fuel gas discharging pipe. In this case, even if a leak compressed fuel gas passing through the leak compressed fuel gas discharging pipe and discharged from the tip end of the discharging pipe to the outside of car-body is ignited by a spark caused by static electricity or the other fire source, catching fire toward the closed space on the pipe connecting portion is prevented by the firing prevention member.

An inner peripheral face of the engaging portion of the cover member is formed in a circular arc shape so as to be contacted with a bottom face of the engaging groove of the pipe joint, and both end portions of the inner peripheral face of the engaging portion are inclined so as to be apart from each other as the end portions approach the opening of the cover member. According to the above construction, the engaging portion of the cover member can be easily engaged with the engaging groove of the pipe joint and the engaging condition can be maintained surely and stably.

An end face of the cover member abutting against the car-body surface has inclined parts which are inclined so as to be apart from the car-body surface as the parts approach the opening of the cover member. According to the above construction, the inclined parts act as wedges to pull the pipe joint toward the outside of the car-body and the edge portion of the car-body opening can be pressingly pinched between the end face of the cover member and the outer face of the swelled portion of the pipe joint, thus the pipe joint and the tip end of the leak compressed fuel gas discharging pipe can be fixed to the car-body opening firmly and stably.

DETAILED DESCRIPTION OF THE PREFERRED EMBODIMENT

Hereinafter a preferred embodiment of the present invention will be described with reference to FIGS. 1 to 7.

Figure 1:
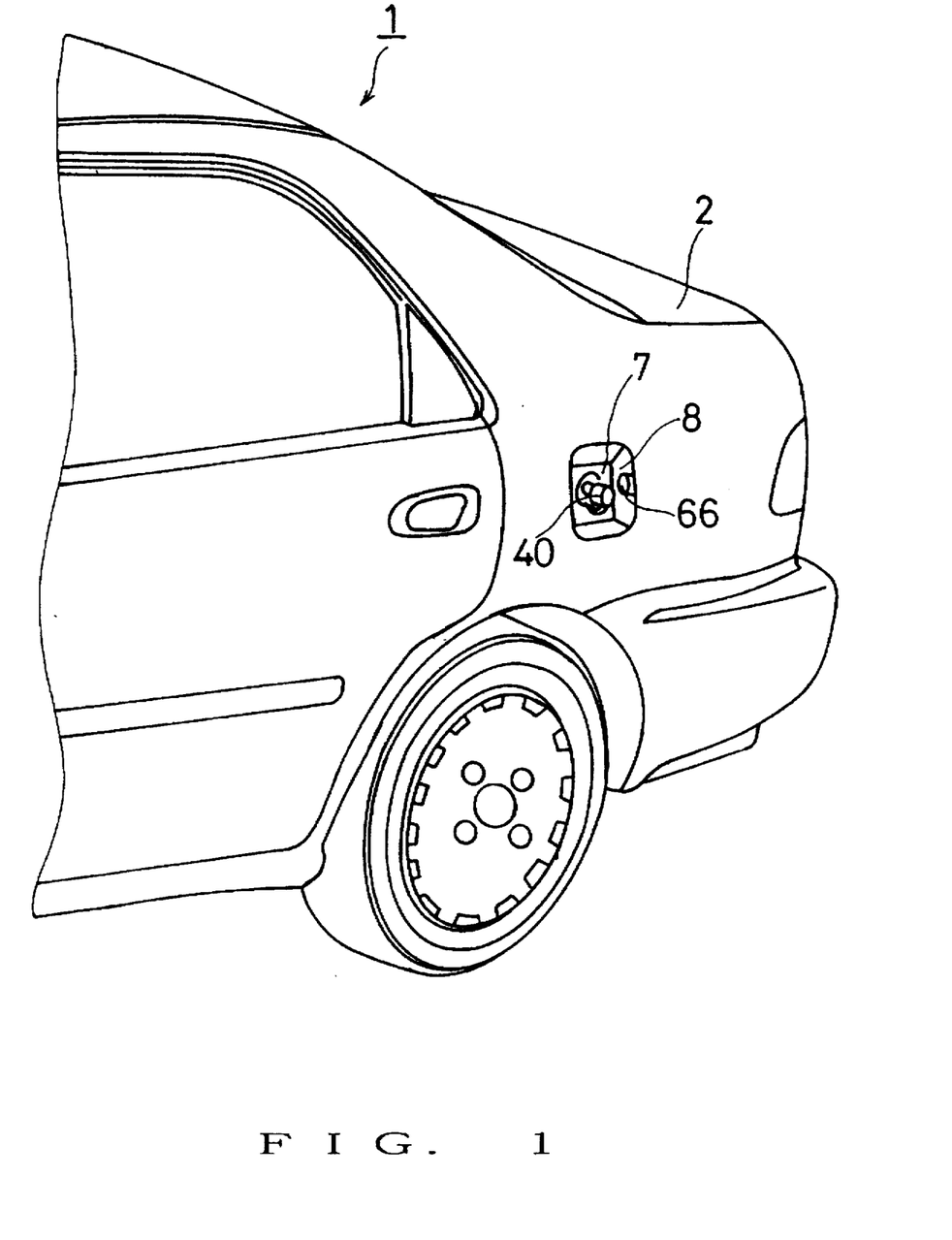
FIG. 1 is a perspective view of an essential part of a passenger car provided with a leak compressed fuel gas discharging device according to the present invention.
Figure 2:
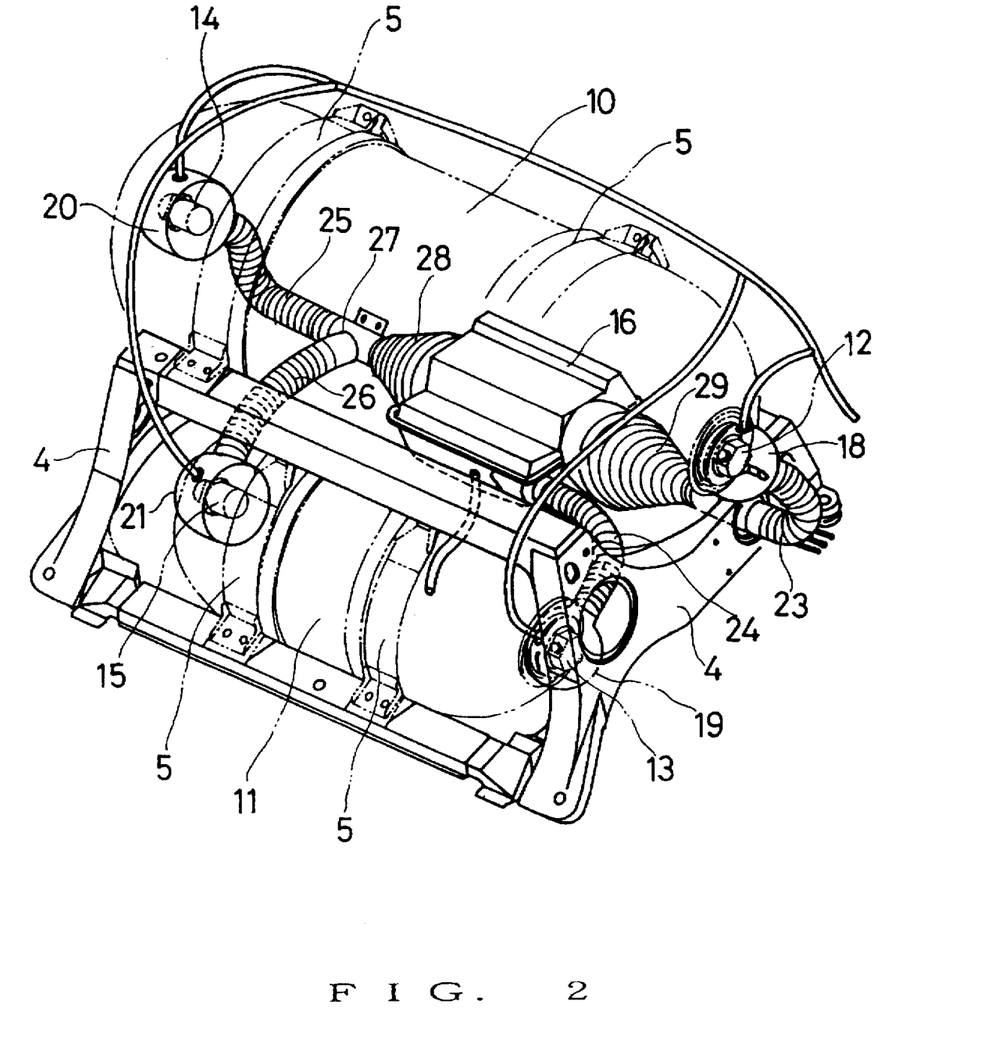
FIG. 2 is a perspective view of fuel cylinders arranged within a rear trunk of the passenger car shown in FIG. 1.

Fuel cylinders 10, 11 which are compressed fuel gas tanks are constructed so as to be able to charge a natural gas lighter than air principally composed of methane or the like and compressed at a pressure of about 200 kg/cm$^2$. The fuel cylinders 10, 11 are arranged within a rear trunk 2 of a passenger car 1 being placed on right and left cylinder supporting frames 4 with the fuel cylinder 11 at the front and the fuel cylinder 10 at the upper rear and fixed to the cylinder supporting frames 4 firmly with attaching bands 5. The cylinder supporting frames 4 stand up from a floor member 3 provided on right and left rear side frames (not shown).

At left ends (right ends in FIGS. 2 and 4) of the fuel cylinders 10, 11 are installed normally closed solenoid valves 12, 13 respectively, and at right ends of the fuel cylinders 10, 11 are installed relief valves 14, 15 respectively. The normally closed solenoid valves 12, 13 are closed when they are not electrified and opened when electrified. The relief valves 14, 15 are opened when the pressures in the fuel cylinders 10, 11 rise above a predetermined set pressure for discharging the charged fuel in the fuel cylinders 10, 11.

Figure 3:
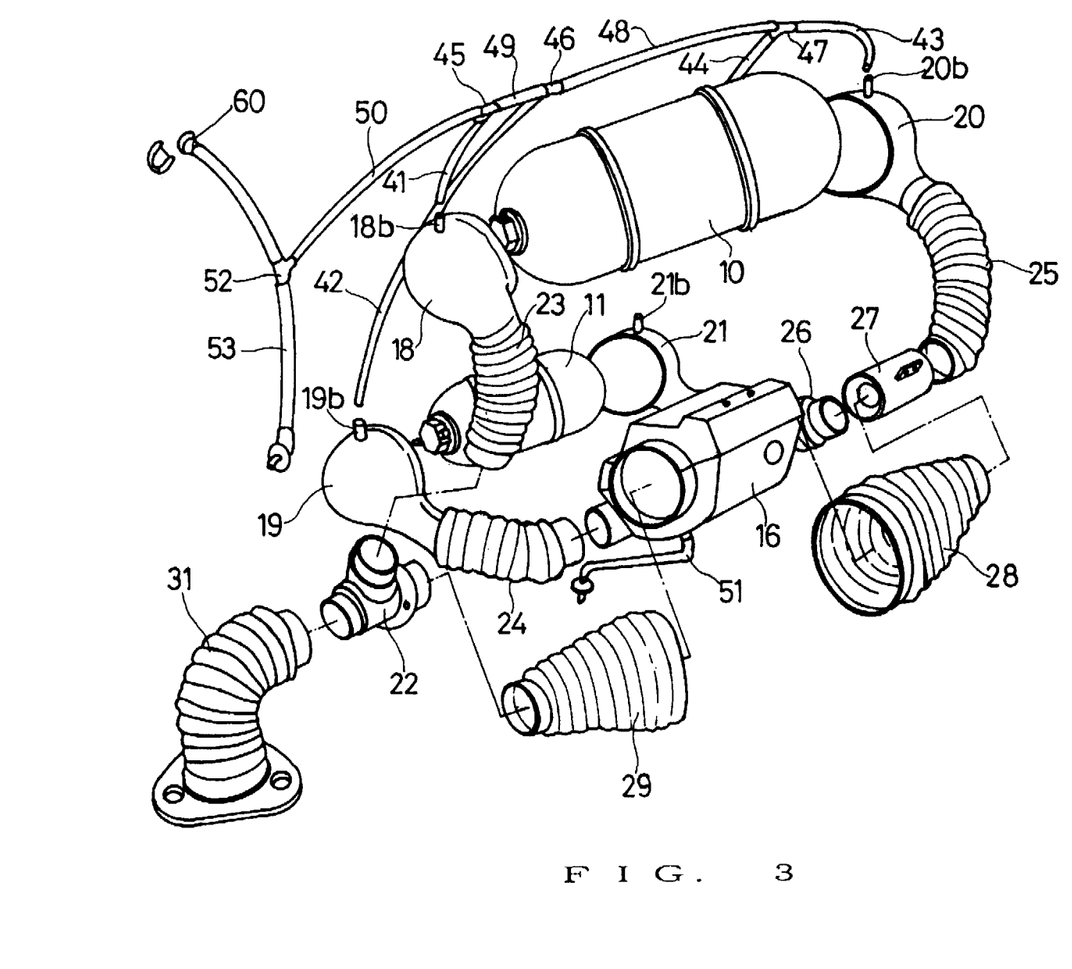
FIG. 3 is a disintegrated perspective view of FIG. 2.

A seal box 16 composed of divided two parts is arranged on the floor member 3 adjacent to the two fuel cylinders 10, 11. The seal box 16 is provided with a compressed natural gas supply auxiliary unit 17 in which a filter for filtering natural gas, sensors for detecting pressure and temperature in the fuel cylinders 10, 11 and instruments necessary for charging compressed natural gas into the fuel cylinder 10, 11 and supplying the natural gas from the fuel cylinders 10, 11 to an internal combustion engine.

At both ends of the fuel cylinders 10, 11 are installed valve coverings 18, 19, 20, 21 which cover the normally closed solenoid valves 12, 13 and the relief valves 14, 15 air- and watertightly respectively. An opening 18a of the valve covering 18 and an opening 22a of a seal boot branching joint 22 are communicatively connected to each other by a seal boot 23, and an opening 19a of the valve covering 19 and an opening 16a of the seal box 16 are communicatively connected to each other.

In addition, an opening 20a of the valve covering 20 and an opening 21a of the valve covering 21 are communicatively connected to openings 27a, 27b of a seal boot branching joint 27 by seal boots 25, 26, respectively. An opening 27c of the seal boot branching joint 27 and an opening 16b of the seal box 16 are communicatively connected to each other by a seal boot 28, an opening 16c of the seal box 16 and an opening 22b of the seal boot branching joint 22 are by a seal boot 29, and an opening 22c of the seal boot branching joint 22 and an opening portion 30 formed in the floor member 3 are by a seal boot 31.

Figure 4:
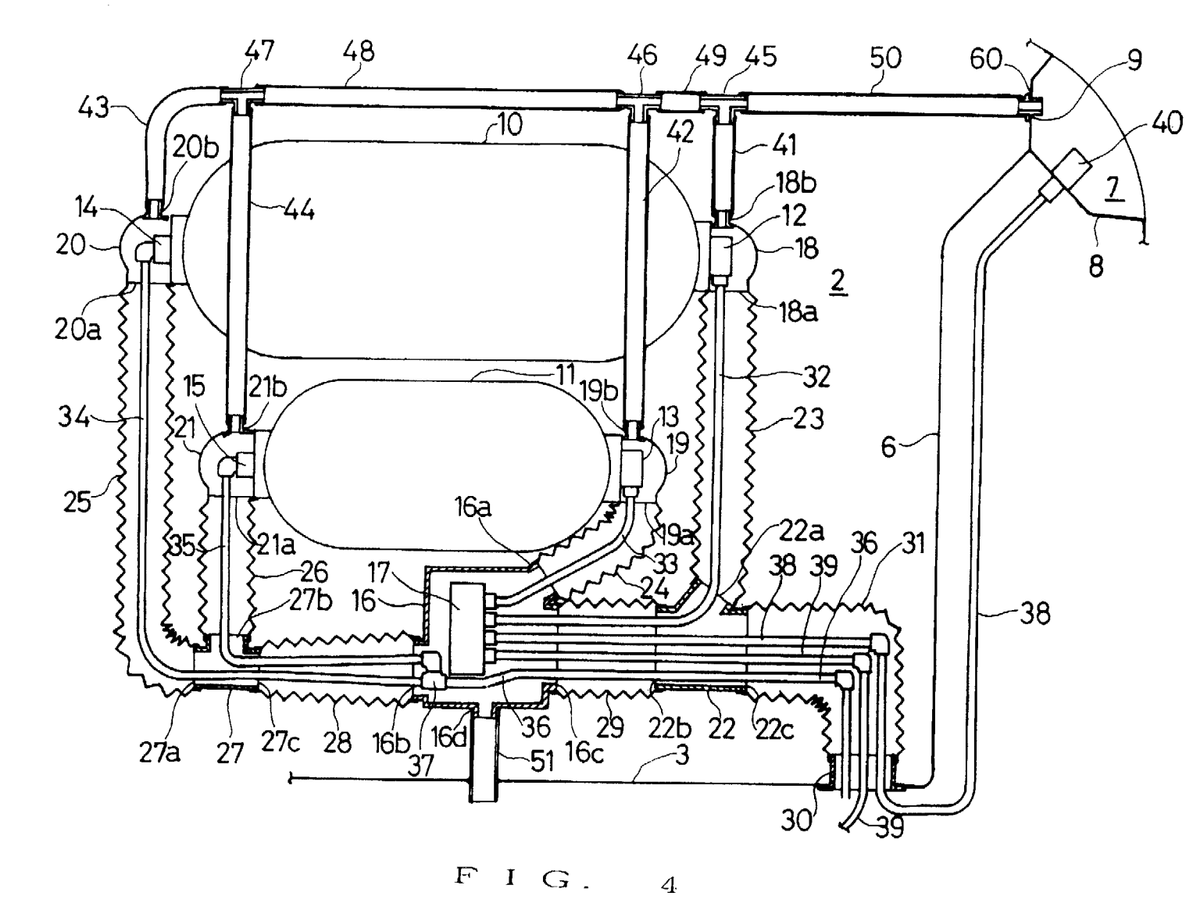
FIG. 4 is a longitudinal sectional view of an essential part of FIG. 2.

A compressed natural gas charging and supplying pipe 32 passes through the seal boot 23, the seal boot branching joint 22 and the seal boot 29. The both ends of the pipe 32 are connected to the normally closed solenoid valve 12 in the valve covering 18 and the compressed natural gas supply auxiliary unit 17 in the seal box 16, respectively. Both ends of a compressed natural gas charging and supplying pipe 33 passing through the seal boot 24 are connected to the normally closed solenoid valve 13 in the valve covering 19 and the compressed natural gas supply auxiliary unit 17 in the seal box 16, respectively.

Further, an end of a relief pipe 34 passing through the seal boot 25, the seal boot branching joint 27 and the seal boot 28 is connected to the relief valve 14 in the valve covering 20, and an end of a relief pipe 35 passing through the seal boot 26, the seal boot branching joint 27 and the seal boot 28 is connected to the relief valve 15 in the valve covering 21. The other ends of the relief pipes 34, 35 are connected to an end of a relief pipe 36 through a pipe joint 37. The relief pipe 36 passes through the seal boot 29, the seal boot branching joint 22, the seal boot 31 and the opening portion 30, and the other end of the relief pipe 36 is exposed to the outside of the car-body below the floor member 3.

A compressed natural gas charging pipe 38 and a compressed natural gas supplying pipe 39 are connected to the compressed natural gas supply auxiliary unit 17 in the seal box 16 and pass through the seal boot 29, the seal boot branching joint 22, the seal boot 31 and the opening portion 30. The compressed natural gas charging pipe 38 is exposed to the outside of the car-body at the opening portion 30, extends upward along a trunk side wall and penetrates a filler wall 8 to be exposed to a filler recess 7. At the exposed end of the compressed natural gas charging pipe 38 is attached a compressed natural gas charging valve 40. The compressed natural gas supplying pipe 39 exposed to the outside of the car-body at the opening portion 30 extends forward along the under surface of the floor member 3 to be connected to a not shown internal combustion engine mounted on a front portion of the passenger car 1.

Ends of leak natural gas discharging tubes 41, 42, 43, 44 made of flexible rubbers are connected to tube connecting portions 18b, 19b, 20b, 21b of the valve coverings 18, 19, 20, 21, respectively.

The other ends of the leak natural gas discharging tubes 41, 42, 43, 44 are connected to a leak natural gas discharging line composed of tubes 48, 49 and 50 through pipe joint 47, 46 and 45. The tip end of the leak natural gas discharging tube 50 is connected to a filler opening 9 in the filler recess 7 through a pipe joint 60.

To a lower opening 16d of the seal box 16 is connected an upper end of a drain pipe 51 which penetrates the floor member 3. The lower end of the drain pipe 51 is exposed to the outside of the car-body and water condensed in the seal boots 23, 24, 25, 26, 28 and the seal box 16 is discharged through the drain pipe 51 to the outside of the car.

While the pipe joint 45 and the pipe joint 60 are connected to each other through the leak natural gas discharging tube 50 in FIG. 4, an upper end of a drain hose 53 may be connected to the leak natural gas discharging tube 50 through a pipe joint 52 inserted in the tube 50 and a lower end of the drain hose 53 may be connected to the seal box 16 as shown in FIG. 3.

Figure 5:
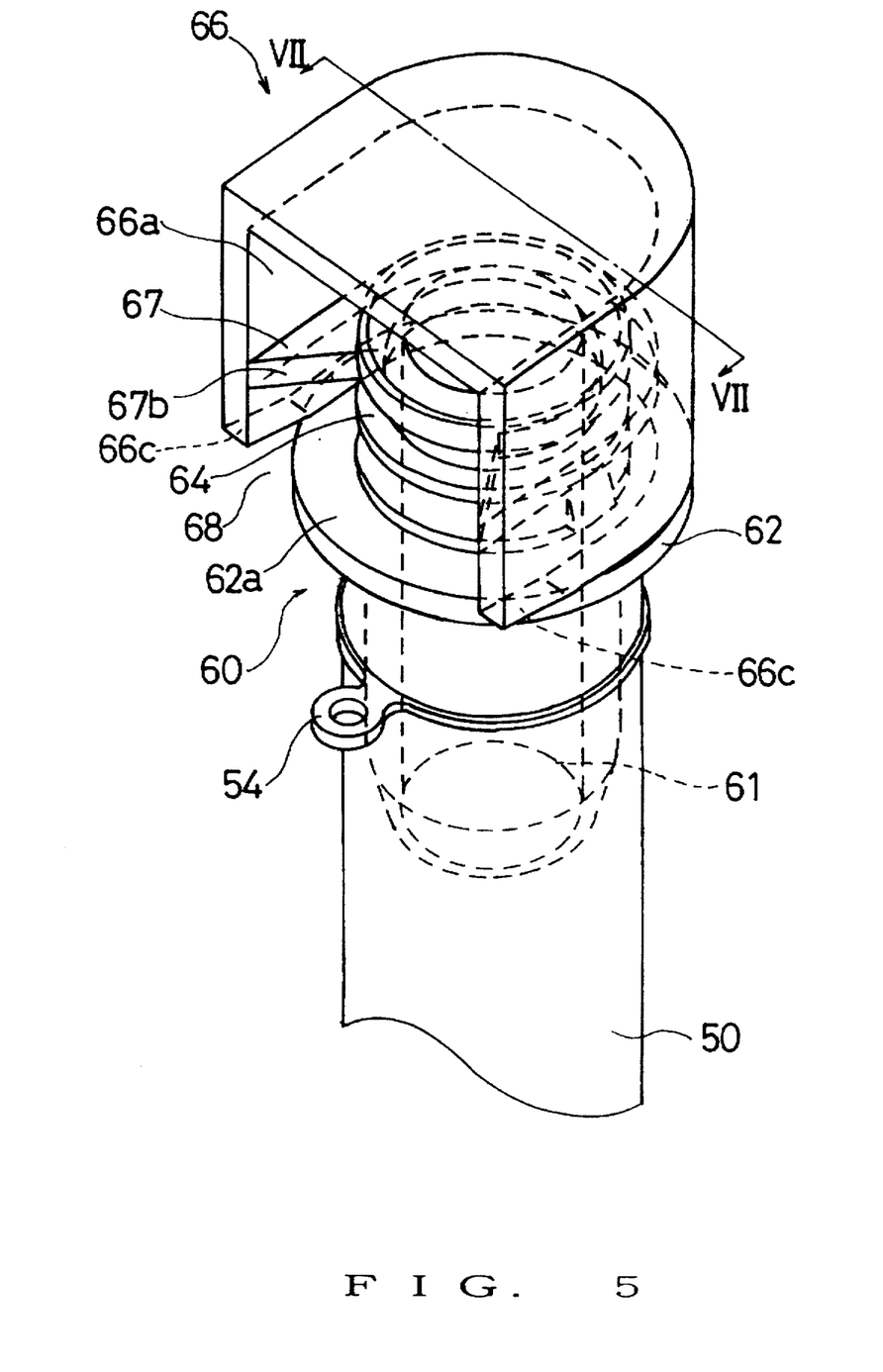
FIG. 5 is a perspective view showing an attaching construction for a tip end of a leak compressed fuel gas discharging pipe according to one embodiment of the present invention.
Figure 6:
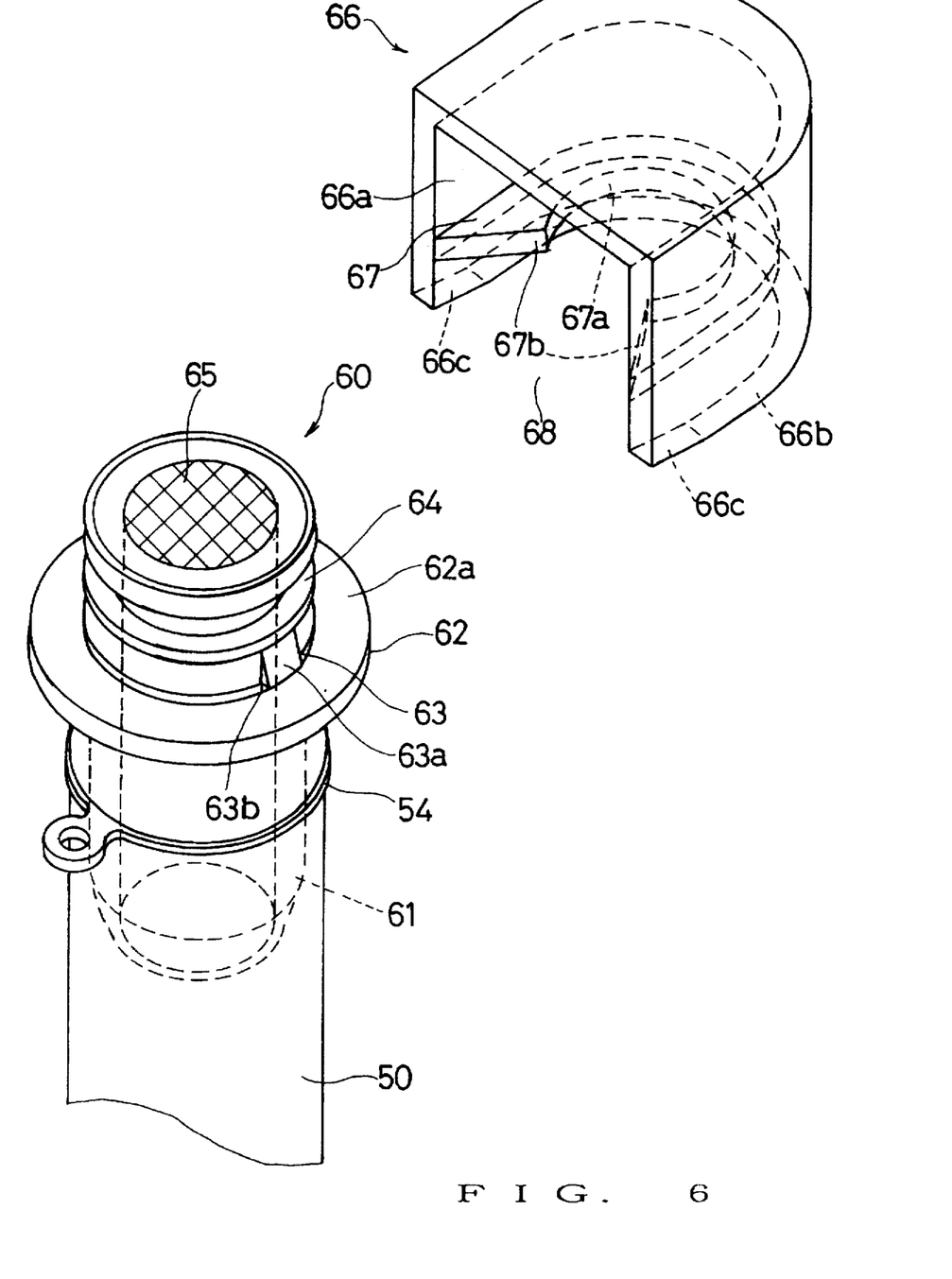
FIG. 6 is a disintegrated perspective view of FIG. 5.
Figure 7:
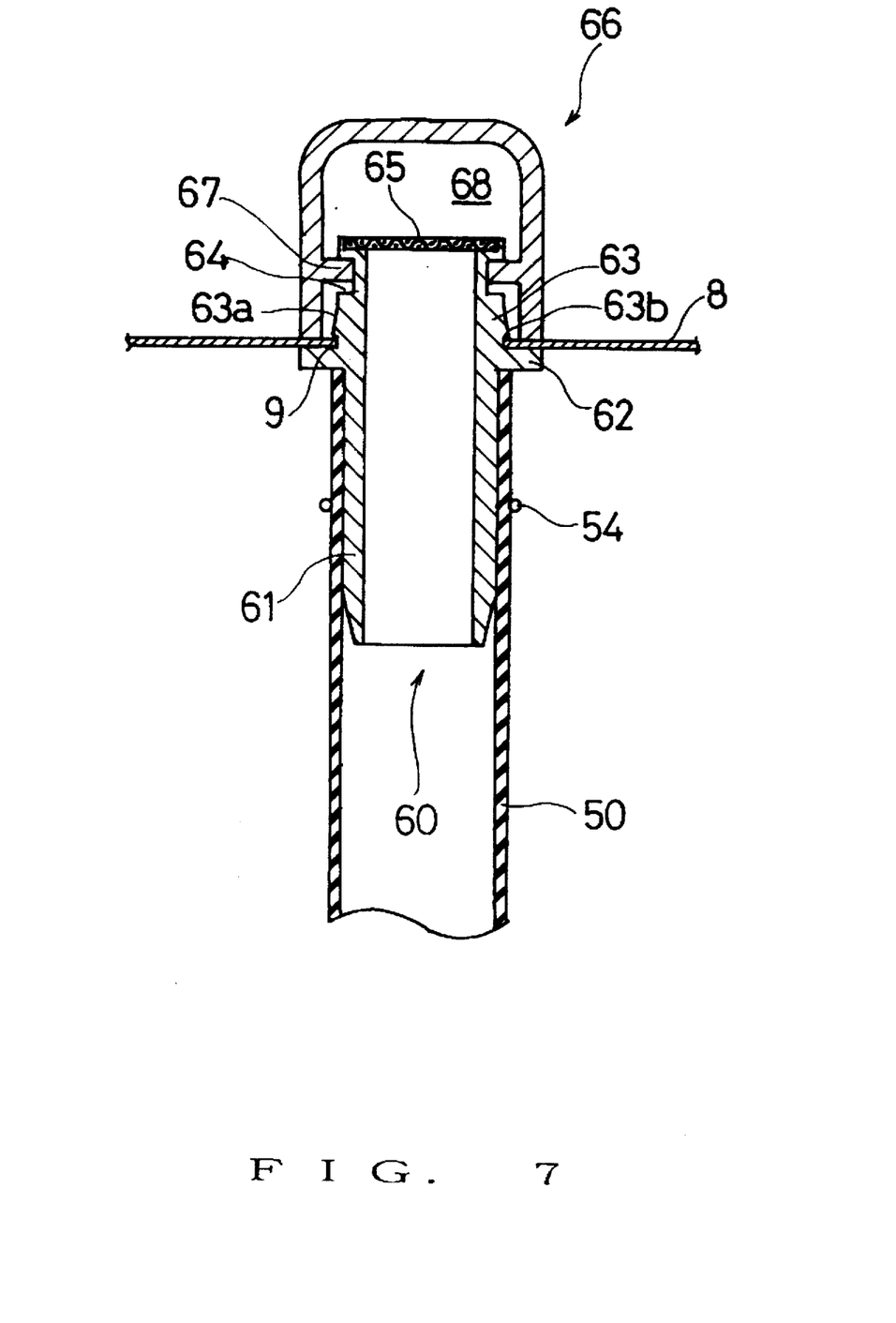
FIG. 7 is a longitudinal sectional side view along the line VII—VII of FIG. 5.

On the outer peripheral surface of the pipe joint 60 is formed a flange 62 which is swelled portion, and a stopper 63 having a tapering inclined surface 63a is formed leaving a space corresponding to the thickness of the filler wall 8 from an outer end surface 62a of the flange 62 facing toward the tip end side of the pipe joint 60. A peripheral engaging groove 64 is formed at an outer side of the stopper 63. On a tip end surface of the pipe joint is fixedly attached a wire net 65 as a firing prevention member.

On an inner peripheral surface 66a of a cover member 66 having a semi cylindrical wall with tangentially extending side edge portions and covered by a plane plate from above is formed an engaging portion 67 adapted to engage detachably with the engaging groove 64 of the pipe joint 60. A greater part of the inner peripheral face 67a of the engaging portion 67 is formed in a circular arc shape so as to be contacted with a bottom face 64a of the engaging groove 64, and both end portions 67b of the inner peripheral face 67a of the engaging portion 67 are inclined so as to be apart from each other as the end portions 67 approach an opening 68 of the cover member 66.

An end face 66b of the cover member 66 abutting against the car-body surface has inclined parts 66c which are inclined so as to be apart from the car-body surface as the parts approach the opening 68 of the cover member 66.

According to the embodiment of the invention shown in FIG. 1–7, in order to connect the fuel cylinder 10, 11, the compressed natural gas supply auxiliary unit 17, the compressed natural gas charging valve 40 and a not shown internal combustion engine to each other and close up tightly the group of pipes, at first, the compressed natural gas charging and supplying pipe 32 is inserted in the seal boot 23, the seal boot branching joint 22, the seal boot 29 and the seal box 16, the compressed natural gas discharging and supplying pipe 33 is inserted in the seal boot 24 and the seal box 16, the relief pipe 34 is inserted in the seal boot 25, seal boot branching joint 27, the seal boot 28 and the seal box 16, the relief pipe 35 is inserted in the seal boot 26, the seal boot branching joint 27, seal boot 28 and the seal box 16, and the relief pipe 36, the compressed natural gas charging pipe 38 and the compressed natural gas supplying pipe 39 are inserted in the opening 30, the seal boot 31, the seal boot branching joint 22, the seal boot 29 and the seal box 16.

Next, both ends of the compressed natural gas charging and supplying pipe 32 are connected to the normally closed solenoid valve 12 and the compressed natural gas supply auxiliary unit 17 and both ends of the seal boot 23 are fitted and attached to the opening 18a of the valve covering 18 and the opening of the seal boot branching joint 22 air- and watertightly by means of a not shown tightening band.

After that, the similar workings are carried out for the relief pipes 35, 36, the pipe joint 37, the compressed natural gas charging pipe 38 and the compressed natural gas supplying pipe 39, and at last the divided two parts of the seal box 16 are connected integrally.

To the tip end of the leak natural gas discharging tube 50 connected to the valve coverings 18, 19, 20, 21 through the leak natural gas discharging tubes 41, 42, 43, 44, 48, 49 and the pipe joints 45, 46, 47, the base portion 61 of the pipe joint 60 is fitted and fixed air- and watertightly so that the pipe joint 60 can not be extracted. Accordingly, in the state that the pipe joint 60 is integrally attached to the filler opening 9 of the filler wall 8, even if a force tending to extract the leak natural gas discharging tube 50 from the pipe joint 60 is applied, the leak natural gas discharging tube 50 can maintain its connected state to the pipe joint 60.

In order to attach the pipe joint 60 to the filler opening 9 of the filler wall 8, the pipe joint 60 is strongly pressed into the filler opening 9 of the filler wall 8 from the interior of the rear trunk 2 toward the outside of the car-body. The base portion 61 and the stopper 63 is deformed elastically toward the center so that the inclined surface 63a of the stopper 63 passes over the filler opening 9 of the filler wall 8 and the pipe joint 60 is held by the holding end face 63b of the stopper 63 so as not to be extracted from the filler opening 9.

Next, both end portions 67b of the engaging portion 67 of the cover member 66 are touched to the engaging groove 64 of the pipe joint 60 extruded from the filler wall 8 and the cover member 66 is pressed strongly against the pipe joint 60, then the cover member 66 is deformed elastically to move the both end portions 67b of the engaging portion 67 outwardly, and thus the cover member 66 is attached so as not to be extracted from the pipe joint 60.

When the cover member 66 is pressed against the pipe joint 60 as mentioned above, firstly the inclined faces 66c at both ends of the car-body abutting end face 66b of the cover member 66 are contacted with the surface of the filler wall 8 and then the end face 66b is contacted, during which the engaging portion 67 of the cover member 66 gives to the pipe joint 60 a force to draw the pipe joint 60 out of the filler opening 9 so that the filler wall 8 is strongly pinched between the outer end face 62a of the flange 62 of the pipe joint 60 and the car-body abutting end face 66b of the cover member 66. Thus, the pipe joint 60, that is, the tip end of the leak natural gas discharging tube 50 is firmly attached to the filler wall 8 and there is no fear that the pipe joint 60 or the leak natural gas discharging tube 50 is disconnected from the filler opening 9 of the filler wall 8.

In case that the natural gas leaks from any connection among the compressed natural gas charging and supplying pipes 32, 33, the relief pipes 34, 35, 36, the compressed natural gas charging pipe 38 and the compressed natural gas supplying pipe 39, the leak natural gas which is lighter than air rises in the seal boots 23, 24, 25, 26, seal boots 28, 29 and the seal boot 31, passes through the leak natural gas discharging tubes 41, 42, 43, 44, 48, 49, 50 and is discharged smoothly in the atmosphere from the opening of the pipe joint 60 at the filler recess 7.

In case that the natural gas discharged from the opening of the pipe joint 60 into the atmosphere is contacted with a spark due to static electricity or the other fire source and ignited, catching fire in the leak natural gas discharging tube 50 and the closed space on the up-stream side is prevented by the wire net 65.

In the case that the fuel cylinders 10, 11 are charged with LPG (liquefied petroleum gas) which is heavier than air, LPG leaked from any connection among the compressed natural gas charging and supplying pipes 32, 33, the relief pipes 34, 35, 36, the compressed natural gas charging pipe 38 and the compressed natural gas supplying pipe 39 is discharged in the atmosphere under the floor member 3 through the seal boots 29, 31 and the opening 30. In addition, since air can enter the closed space from the opening of the pipe joint 60 through the leak natural gas discharging tubes 50, 49, 48, 44, 43, 42, 41, replacement of the leak LPG by the air within the closed space is carried out smoothly and the leak LPG is discharged to the outside of the car-body surely and in a short time.

What is claimed is:

1. A leak compressed fuel gas discharging device in an automobile having a compressed fuel gas tank arranged within a shut-up compartment, comprising:

a valve provided on an inlet and outlet of said compressed gas tank at each end thereof;

a valve covering for hermetically covering said valve so as to seal said inlet and outlet of said compressed gas tank;

a leak compressed fuel gas discharging tube having base end and distal end, said base end connected to said valve covering such that said gas discharging tube extends from said sealed inlet and outlet to an opening of a car body wall;

a tube connecting portion for hermetically interconnecting said valve covering and said base end of said leak compressed fuel gas discharging tube;

a pipe joint integrally fitted with said distal end of said leak compressed fuel gas discharging tube and detachably inserted into an opening on a car-body wall from inside toward outside of said compartment, said pipe joint having a swelled portion formed on a outer peripheral surface at inside of said compartment and an engaging groove formed in a peripheral direction on a outer peripheral surface at outside of said compartment; and a generally semi-cylindrical shaped cover member for covering said pipe joint outside of said compartment, said cover member having an opening for accommodating a distal end of said pipe joint and an engaging portion provided on an inner surface adjacent to said opening, said engaging portion detachably engageable with said engaging groove of said pipe joint, whereby gas leakage from said compressed fuel gas tank is vented into said leak compressed fuel gas discharging tube and smoothly into the atmosphere through said pipe joint and said opening of said cover member.

2. A leak compressed fuel gas discharging device claimed in claim 1, wherein said pipe joint is detachably fitted into an opening formed on a car-body wail surrounding a fuel charging mouth.

3. A leak compressed fuel gas discharging device claimed in claim 1 or 2, wherein a firing prevention member is provided on said distal end of said leak compressed fuel gas discharging tube.

4. A leak compressed fuel gas discharging device claimed in claim 1 or 2, wherein a greater part of an inner peripheral face of said engaging portion is formed in a circular arc shape so as to be contacted with a bottom face of said engaging groove, and both end portions of said inner peripheral face of said engaging portion are inclined so as to be apart from each other as said end portions approach said opening of said cover member.

* * * * *